United States Patent
Yamada et al.

(10) Patent No.: US 6,910,131 B1
(45) Date of Patent: Jun. 21, 2005

(54) PERSONAL AUTHENTICATION SYSTEM AND PORTABLE UNIT AND STORAGE MEDIUM USED THEREFOR

(75) Inventors: Miki Yamada, Yokohama (JP); Tomoaki Morijiri, Fuchu (JP); Toshiaki Saisho, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/506,377

(22) Filed: Feb. 18, 2000

(30) Foreign Application Priority Data

Feb. 19, 1999 (JP) .......................... 11-041564

(51) Int. Cl.⁷ .......................... H04K 1/02; H04L 9/00
(52) U.S. Cl. .......................... 713/186; 713/172
(58) Field of Search .......................... 713/172, 162, 713/163, 168–186, 200, 201; 380/255, 258

(56) References Cited

U.S. PATENT DOCUMENTS

| | | | | |
|---|---|---|---|---|
| 4,993,068 A | * | 2/1991 | Piosenka et al. | 713/186 |
| 5,153,918 A | * | 10/1992 | Tuai | 713/182 |
| 5,420,924 A | * | 5/1995 | Berson et al. | 713/186 |
| 5,644,710 A | * | 7/1997 | Johnson et al. | 713/200 |
| 5,721,779 A | * | 2/1998 | Funk | 713/155 |
| 5,790,668 A | * | 8/1998 | Tomko | 713/186 |
| 5,805,712 A | * | 9/1998 | Davis | 713/173 |
| 5,822,431 A | * | 10/1998 | Sprunk | 713/150 |
| 5,825,871 A | * | 10/1998 | Mark | 379/357.03 |
| 5,864,622 A | * | 1/1999 | Marcus | 713/186 |
| 6,076,167 A | * | 6/2000 | Borza | 713/201 |
| 6,085,323 A | * | 7/2000 | Shimizu et al. | 713/201 |
| 6,484,260 B1 | * | 11/2002 | Scott et al. | 713/186 |
| 6,697,947 B1 | * | 2/2004 | Matyas et al. | 713/182 |

FOREIGN PATENT DOCUMENTS

| | | | | |
|---|---|---|---|---|
| JP | 10-154192 | | 6/1998 | |
| JP | 10154192 A | * | 6/1998 | G06F/19/00 |

\* cited by examiner

*Primary Examiner*—Gregory Morse
*Assistant Examiner*—Matthew Heneghan
(74) *Attorney, Agent, or Firm*—Finnegan, Henderson, Farabow, Garrett & Dunner, L.L.P.

(57) ABSTRACT

When a personal authentication is to be executed, the encryption section of an IC card encrypts biological data and supplies the obtained ciphertext to a sensor unit. When the decryption section of the sensor unit obtains biological data by decrypting the ciphertext, a collation section collates the biological data with input biological measurement data, thereby authenticating personal identification.

17 Claims, 4 Drawing Sheets

PERSONAL AUTHENTICATION SYSTEM AND PORTABLE UNIT AND STORAGE MEDIUM USED THEREFOR

BACKGROUND OF THE INVENTION

This application is based on Japanese Patent Application No. 11-41564, filed Feb. 19, 1999, the contents of which are incorporated herein by reference.

The present invention relates to a personal authentication system using a portable unit such as an IC card and a portable unit and storage medium used for the system, more particularly, to a personal authentication system capable of preventing fraud based on tapping, and a portable unit and storage medium used for the system.

In general, in a field in which personal rights are verified, personal authentication systems are widely used to verify the rights of persons who hold portable ID card such as credit cards used in business transactions or entrance/exit management cards in restricted areas.

Magnetic cards are generally used as ID cards of this type. Recently, high-security, high-performance IC cards incorporating semiconductor chips have been used. As compared with a magnetic card, this IC card is designed to make it difficult to read/write internal information, and hence is expected to prevent frauds such as counterfeiting and leakage of information.

If, however, such an IC card is simply designed to hold internal information, it is difficult to prevent another person from fraudulently using the card upon loss or theft or pretending that the card is lost.

In order to prevent such frauds, an IC card is designed to register personal authentication information therein. This allows the collation section of a personal authentication unit to collate the personal authentication information transmitted from the IC card with input information separately obtained by input operation, thereby verifying the right of the person who holds the IC card. Note that the personal authentication information may be a password or the like.

In the above personal authentication system, however, there is a possibility that communication contents between the IC card and the IC card reader/writer and between the IC card reader/writer and the collation section of the sensor unit are tapped, and the personal authentication information is fraudulently read out and used.

BRIEF SUMMARY OF THE INVENTION

It is an object of the present invention to provide a personal authentication system in which even if data between a portable unit and a personal authentication unit is tapped, any information is prevented from being read from the tapped contents, and fraudulent use of the information can be prevented, and a portable unit and storage medium used for the system.

In order to achieve the above object, according to the first aspect of the present invention, there is provided a portable unit comprising storage means for storing registration data, and encryption means for encrypting the registration data stored in the storage means in executing personal authentication based on the registration data and new input information, and supplying the obtained ciphertext to a personal authentication unit which is communicatively connected to the portable unit and executes the personal authentication.

According to the second aspect of the present invention, there is provided a personal authentication unit having tamper resistance, comprising tamper-resistant decryption means for obtaining registration data by decrypting a ciphertext supplied from a portable unit for storing the registration data and outputting the ciphertext obtained by encrypting the registration data, input means for inputting input information, and collation means for collating the registration data obtained from the decryption means with the input information input from the input means.

According to the third aspect of the present invention, there is provided a portable unit comprising means for storing registration data, and encryption means for, in executing a personal authentication based on the registration data and new input information, supplying a ciphertext obtained by encrypting the registration data stored in the storage means to a fixed section which is communicatively connected to the portable unit and performs transfer processing including encryption between the portable unit and a plurality of personal authentication units for performing personal authentication.

According to the fourth aspect of the present invention, there is provided a personal authentication system having tamper resistance, comprising a tamper-resistant fixed section including first tamper-resistant decryption means for obtaining registration data by decrypting a ciphertext supplied from a portable unit for storing the registration data and outputting the ciphertext obtained by encrypting the registration data, encryption means for sending the ciphertext obtained by encrypting the registration data obtained from the first decryption means with a predetermined cryptographic key, a plurality of tamper-resistant personal authentication units each of which is movably installed, second decryption means for obtaining registration data by decrypting the ciphertext sent from the encryption means with a predetermined cryptographic key, and collation means for collating the registration data obtained from the second decryption means with the input information.

According to the fifth aspect of the present invention, there is provided a computer readable medium used for a tamper-resistant portable unit which can communicate with a personal authentication unit for executing personal authentication and includes a computer, the medium storing a program for causing the computer to execute a procedure for storing registration data in storage means, and causing the computer to execute an encryption procedure for encrypting the registration data and supplying a obtained ciphertext to the personal authentication unit when executing the personal authentication.

According to the sixth aspect of the present invention, there is provided a computer readable medium used for a tamper-resistant personal authentication unit having a computer for executing a personal authentication on the basis of a ciphertext supplied from a tamper-resistant portable unit for storing registration data and outputting a ciphertext obtained by encrypting the registration data, the medium storing a program for causing the computer to execute a decryption procedure for obtaining registration data by decrypting the ciphertext supplied from the portable unit, causing the computer to execute an input procedure for inputting input information, and causing the computer to execute a collation procedure for collating the registration data obtained by the decrypt procedure with the input information.

According to the seventh aspect of the present invention, there is provided a computer readable medium used for a tamper-resistant portable unit having a computer and capable of communicating with a personal authentication system including a tamper-resistant fixed section which has a computer and obtains registration data by decrypting a ciphertext supplied from a tamper-resistant portable unit for storing registration data and outputting a ciphertext obtained by encrypting the registration data, encrypts the obtained registration data by using a predetermined cryptographic key, and transfers the ciphertext to one or more personal authentication units for executing personal authentications, and the plurality of tamper-resistant personal authentication units each of which has a computer, decrypts the ciphertext from the fixed section, and collates obtained information with input information, thereby executing a personal authentication, the medium storing a program for causing the computer to execute a procedure for storing registration data, and causing the computer to execute an encryption procedure for supplying the ciphertext obtained by encrypting the registration data to the fixed section when executing the personal authentication.

According to the eighth aspect of the present invention, there is provided a computer readable medium used for a personal authentication system including a tamper-resistant fixed section which has a computer and obtains registration data by decrypting a ciphertext supplied from a tamper-resistant portable unit for storing registration data and outputting a ciphertext obtained by encrypting the registration data, encrypts the obtained registration data by using a predetermined cryptographic key, and transfers the ciphertext to one or more personal authentication units for executing personal authentications, and the plurality of tamper-resistant personal authentication units each of which has a computer, decrypts the ciphertext from the fixed section, and collates obtained information with input information, thereby executing a personal authentication, the medium storing a program for causing the computer of the fixed section to execute a first decryption procedure for obtaining registration data by decrypting a ciphertext supplied from the portable unit, causing the computer to execute a second encrypt procedure for encrypting the registration data obtained by the first decryption procedure with a predetermined cryptographic key and sending the obtained ciphertext, causing at least one of the computers of the personal authentication units to execute a second decryption procedure for obtaining registration data by decrypting the ciphertext sent by the second encryption procedure with a predetermined cryptographic key, and causing the computer to execute a collation procedure for collating the registration data obtained by the second decrypt procedure with the input information.

According to the present invention, there are provided a personal authentication system in which even if data between the portable unit and the personal authentication unit is tapped, any information is prevented from being read from the tapped contents, and fraudulent use of the information can be prevented, and a portable unit and storage medium used for the system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Each embodiment of the present invention will be described below with reference to the views of the accompanying drawing. More specifically, in each embodiment described below, personal biological data is used instead of conventional passwords in consideration of biometric techniques that have currently received attention. Note that biometrics is a technique of recognizing persons by using biological data. The technical range of biometrics includes, for example, fingerprint recognition, speech recognition, handwritten signature recognition, retina scan recognition, and hand geometry recognition (hand shape, finger length, and the like). However, each embodiment can also be effectively applied to an arrangement designed to collate passwords with input data.

(First Embodiment)

Figure 1:
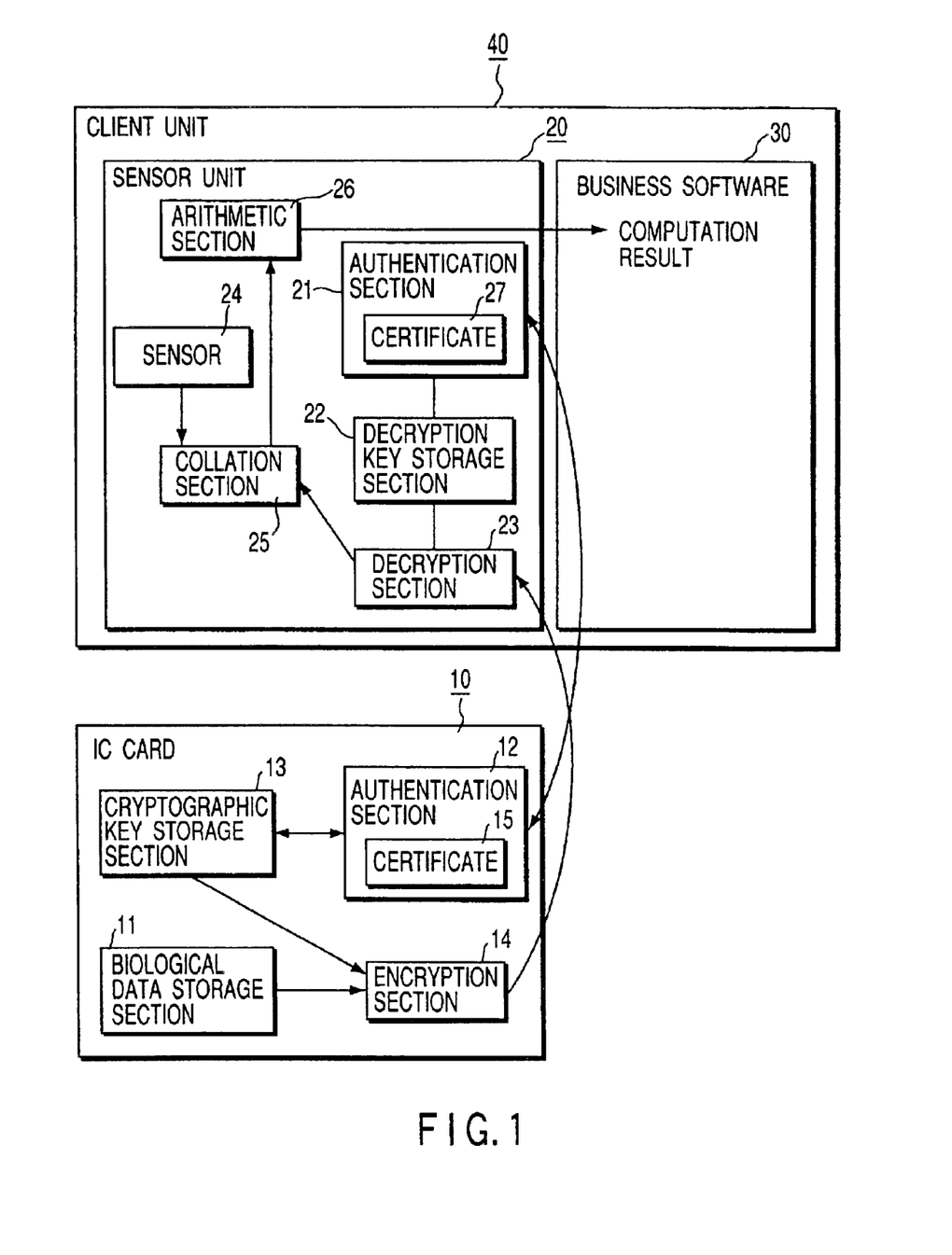
FIG. 1 is a block diagram showing the arrangement of a personal authentication system according to the first embodiment of the present invention.

FIG. 1 is a block diagram showing the arrangement of a personal authentication system according to the first embodiment of the present invention. This personal authentication system includes a tamper-resistant IC card 10 and tamper-resistant sensor unit 20 as two types of main constituent elements.

Note that tamper resistance is the property of protecting internal information from peeping and tampering. This property can be implemented by adding a known function such as the function of erasing internal information in response to unauthorized access.

This personal authentication system includes a client unit 40. The client unit 40 has a reader/writer function of capable of reading/writing information from/in the inserted IC card (portable unit) 10, the sensor unit 20, and business software 30 as well as the general computer function of performing arithmetic processing, display processing, and the like. Note that the reader/writer function may be provided as a discrete unit. The client unit 40 and IC card 10 are implemented by computers which load programs from storage media such as magnetic disks and are controlled by the programs. Note that when biological data is to be registered, the IC card 10 loads a program and operates on the basis of the program afterward.

In this case, the IC card 10 has tamper resistance and includes a biological data storage section 11, authentication section 12, cryptographic key storage section 13, and encryption section 14. The biological data storage section 11 is a section in which personal biological data is readably stored in advance. As biological data, for example, fingerprint data, speech (voiceprint) data, handwritten signature data, retina pattern data, or hand geometry data can be used, as needed. Note that the IC card may be implemented by using firmware designed in advance instead of loading of a program.

The authentication section 12 performs a mutual authentication with the sensor unit 20, and has a certificate 15 for certifying the validity of the self-unit (IC card), a public key Pa of an authentication office for verifying the certificate sent from the sensor unit 20, an authentication office name for collating verified contents, and a private key Si of the self-unit.

The certificate 15 has at least the following three data: the value of a public key Pi of the IC card, the name of the authentication office that has issued the certificate 15, and the signature obtained by digital signature of a combination of the value of the public key Pi and the authentication office name with a private key Sa of the authentication office.

More specifically, the authentication section 12 has the function of verifying a certificate from the sensor unit 20 when the IC card 10 is inserted into the client unit 40, the function of causing the IC card to authenticate information indicating that the sensor unit 20 has a private key Ss of the sensor unit 20, and the function of causing the sensor unit 20 to authenticate information indicating that the IC card 10 has the private key Si.

In the authentication section 12, the function of verifying a certificate from the sensor unit 20 is constituted by the function of receiving the certificate 27 from the sensor unit 20 and the function of verifying the certificate received from the sensor unit 20 by using the public key Pa of the authentication office, and checking the verified result by using the authentication office name.

The function of causing the authentication section 12 to authenticate information indicating that the sensor unit 20 has the private key Ss is constituted by the function of sending the certificates 15 to the sensor unit 20 and the function of generating a new cryptographic key R (pseudorandom number) if the determination result obtained by verifying the certificate indicates "true", the function of encrypting the cryptographic key R with a public key Ps of the sensor unit 20, which is obtained from the certificate from the sensor unit 20, and sending the obtained ciphertext PS[R] to the sensor unit 20, and the function of checking whether the cryptographic key R obtained by decrypting a ciphertext Pi[R] received from the sensor unit 20 with the private key Si of the self-unit coincides with the cryptographic key R sent from the self-unit. If the determination result indicates "true", the cryptographic key R is written in the cryptographic key storage section 13.

Note that the cryptographic key R is not limited to a pseudorandom number but is preferably a pseudorandom number in order to prevent a prediction from a set of ciphertexts R[D] based on each cryptographic key R generated in the past.

In the authentication section 12, the function of causing the sensor unit 20 to authenticate information indicating that the self-unit has the private key Si is constituted by the function of generating a reply M1+M2 containing a message M1 received from the sensor unit 20, and generating R[M1+M2+Si[M1+M2]+certificate 15] by encrypting, using a random number R, both a signature Si[M1+M2] obtained by signing M1+M2 with the private key Si of the self-unit and the certificate 15 of the self-unit, and the function of sending the resultant data to the sensor unit 20, together with Ps[R] obtained by encrypting the random number R with the public key Ps of the sensor unit 20 which is obtained from the certificate from the sensor unit 20. Note that R[M1+M2+Si[M1+M2]+certificate 15]+Ps[R] will be referred to as a digital sealed letter DE[M1+M2, Si, Ps; R] hereinafter.

The cryptographic key storage section 13 stores the cryptographic key R that can be read out by the encryption section 14.

The encryption section 14 has the function of sending the ciphertext R[D] obtained by encrypting the biological data D in the biological data storage section 11 with the cryptographic key R in the cryptographic key storage section 13 to a decryption section 23 in the sensor unit 20.

The sensor unit 20 has tamper resistance and includes an authentication section 21, a decryption key storage section 22, the decryption section 23, a sensor 24, a collation section 25, and an arithmetic section 26.

The authentication section 21 performs a mutual authentication with the IC card 10, and includes a certificate 27 for certifying the validity of the self-unit (sensor unit), the public key Pa of the authentication office for verifying the certificate 15 sent from the IC card 10, the authentication office name for confirming verified contents, and the private key Ss of the self-unit. The certificate 27 has at least the following three data: the value of a public key Ps of the sensor unit 20, the name of the authentication office that has issued the certificate 27, and the signature obtained by digital signature of a combination of the value of the public key Ps and the authentication office name with the private key Sa of the authentication office.

More specifically, the authentication section 21 has the function of verifying the certificate 15 from the IC card 10 when the IC card 10 is inserted into the client unit 40, the function of causing the IC card 10 to authenticate information indicating that the self-unit has the private key Si of the IC card 10, and the function of causing the IC card 10 to authenticate information indicating that the self-unit has the private key Ss of the sensor unit 20.

In the authentication section 21, the function of verifying the certificate 15 from the IC card 10 is constituted by the function of sending the certificate 27 to the IC card 10 and the function of verifying the certificate 15 received from the IC card 10 by using the public key Pa of the authentication office, and confirming the verified result by using the authentication office name.

In the authentication section 21, the function of causing the IC card 10 to authenticating information indicating that the self-unit has the private key Si of the IC card 10 is constituted by the function of generating a message M1 with different contents (containing, for example, a random number, time data, and the like) for each authentication, and sending the message M1 to the IC card 10, the function of checking whether the message M1 obtained by decrypting the digital sealed letter DE[M1+M2, Si, PS; R] received from the IC card 10 with the private key Ss of the self-unit coincides with the message M1 sent from the self-unit, and the function of, if the determination result of the certificate 15 contained in the digital. sealed letter [M1+M2, Si, Ps; R] indicates "true", verifying that the signature Si[M1+M2] contained in the digital sealed letter [M1+M2, Si, Ps; R] is signed by the IC card 10. If the determination result of the message M1 is "true", and it is verified that the IC card 10 has signed, the authentication processing by the IC card 10 is terminated. If the determination result is "false" or the signature is not verified, an error display signal is generated, and processing is terminated.

In the authentication section 21, the function of causing the IC card 10 to authenticate information indicating that the self-unit has the private key Ss of the sensor unit 20 is constituted by the function of decrypting the ciphertext PS[R] received from the IC card 10 with the private key Ss of the self-unit, encrypting the obtained cryptographic key R with the public key Pi of the IC card 10 which is obtained from the certificate from the IC card 10, and sending the obtained ciphertext Pi[R] to the IC card 10, and the function of writing the random number R in the decryption key storage section 22.

The decryption key storage section 22 stores the random number R written by the authentication section 21 such that the decryption section 23 can read it out.

The decryption section 23 has the function of decrypting the ciphertext R[D] with the random number R in the decryption key storage section 22 upon reception of the ciphertext R[D] from the encryption section 14 of the IC card 10, and supplying the obtained biological data D to the collation section 25.

The sensor 24 has the function of biologically measuring the user (IC card holder), generating biological measurement data Dm by electronically converting the measurement result, and supplying the biological measurement data Dm to the collation section 25.

The collation section 25 has the function of collating the biological measurement data Dm received from the sensor 24 with the biological data D received from the decryption section 23 and supplying permission data to the arithmetic section 26 if the two data coincide with each other, and the function of generating an error display signal if the data do not coincide with each other. Note that a fingerprint collation unit, hand geometry collation unit, and the like can be used by the sensor 24 and collation section 25, as needed.

The arithmetic section 26 has the function of computing the permission data received from the collation section 25 and supplying the resultant data to the business software 30.

The business software 30 is an application that has arbitrary contents and can be executed upon reception of the resultant data from the arithmetic section 26. For example, arbitrary computer software such as an accounting program or plant control program can be used.

Figure 2:
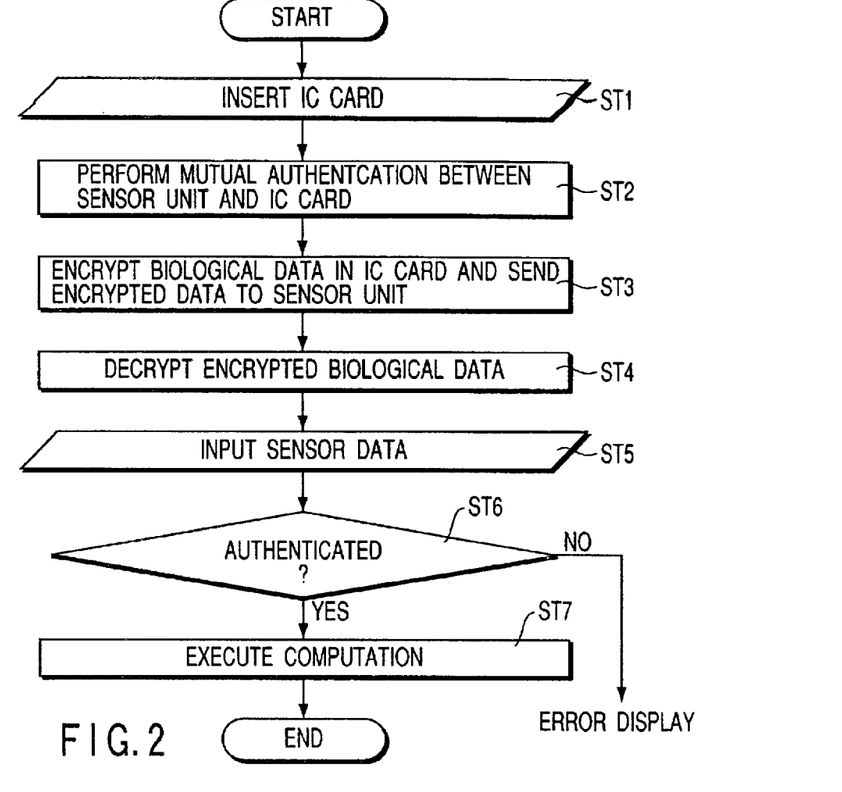
FIG. 2 is a flow chart for explaining the operation of the first embodiment.

The operation of the personal authentication system having the above arrangement will be described next with reference to the flow chart of FIG. 2. Assume that when a user starts the business software 30 on a client/server system in a company to start terminal jobs, the user is authenticated by the IC card 10.

The client unit 40 is powered on by the user to display an instruction such as a command or user ID input request, and waits for insertion of the IC card 10.

When the user inserts the IC card 10 into the client unit 40 (step ST1), the authentication sections 12 and 21 of the IC card 10 and sensor unit 20 execute verification of certificates and mutual authentication of mutually authenticating that both have private keys (step ST2).

Figure 3:
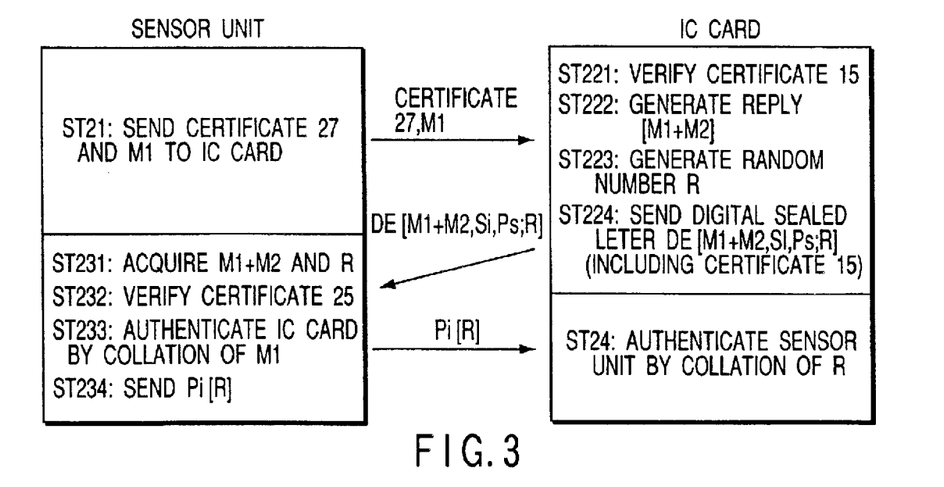
FIG. 3 is a schematic view for explaining a mutual authentication procedure in the first embodiment.

The mutual authentication in step ST2 will be described in detail with reference to FIG. 3 showing an authentication procedure.

Every time the IC card 10 is inserted into the client unit 40, the authentication section 21 of the sensor unit 20 sends the certificate 27 and the message M1 with different contents (e.g., a random number, time data, and the like) to the IC card 10 (step ST21). The message M1 is used for authentication by the IC card 10.

The authentication section 12 of the IC card 10 then verifies the signature of the authentication office (not shown) which is contained in the certificate received from the sensor unit 20 by using the public key Pa of the authentication office, confirms the verified result by using the authentication name, and terminates verification of the certificate 27 if the determination result is "true" (step ST21).

The authentication section 12 of the IC card 10 generates the reply M1+M2 to the message M1 (step ST222), and newly generates the cryptographic key R (step ST223). The authentication section 12 then generates the digital sealed letter DE[M1+M2, Si, Ps; R] containing the certificate 15 and sends it to the sensor unit 20 (step ST224).

The authentication section 21 of the sensor unit 20 decrypts the digital sealed letter DE[M1+M2, Si, Ps; R] received from the IC card 10 by using the private key Ss of the self-unit so as to obtain the signature Si[M1+M2] and the cryptographic key R of the certificate 15 of the IC card 10 (step ST231). The authentication section 21 then decrypts the signature of the authentication office which is contained in the certificate 15 by using the public key Pa of the authentication office, performs true-false determination of the decryption result by using the authentication office name, and terminates the verification of the certificate 15 if the determination result is "true" (step ST232).

If both the true-false determination results obtained by the authentication sections 12 and 21 are "false", an error display signal is generated, and the processing is terminated.

The authentication section 21 of the sensor unit 20 vertifies the signature Si[M1+M2] of the IC card 10 by using the public key Pi of the IC card 10 which is obtained from the certificate 15, and performs true-false determination of the verified result by using M1+M2 or a message digest of M1+M2. The authentication section 21 also performs true-false determination to check whether the message M1 received from the sensor unit 20 coincides with the message M1 generated by the self-unit. If both the determination results are "true", the authentication section 21 completes the authentication of information indicating that the IC card 10 has the private key Si of the IC card 10 and is currently connected to the client unit 40, and writes the cryptographic key R in the decryption key storage section 22. If either of the two determination results is "false", an error display signal is generated, and the processing is terminated (step ST233).

The authentication section 21 of the sensor unit 20 encrypts the cryptographic key R with the public key Pi of the IC card 10, and sends the obtained ciphertext Pi[R] to the IC card 10 (step ST234).

The authentication section 12 of the IC card 10 then checks whether the cryptographic key R obtained by decrypting the ciphertext Pi[R] received from the sensor unit 20 with the private key Si of the self-unit coincides with the cryptographic key R sent from the self-unit. If the determination result is "true", the authentication section 12 completes authentication of information indicating that the sensor unit 20 has the private key Ss of the sensor unit 20 and is currently connected to the client unit 40, and writes the cryptographic key R in the cryptographic key storage section 13. If the determination result is "false", an error display signal is generated, and the processing is terminated (step ST24). The mutual authentication procedure in step ST2 is terminated (step ST2).

The above mutual authentication procedure (step ST2) may be replaced with another procedure of mutually verifying certificates, mutually performing authentication, and sharing the cryptographic key R while concealing it from a communication path.

A case wherein both the true-false determination results in the authentication sections 12 and 21 are "true", and mutual authentication is complete will be described next. When this mutual authentication is complete, the two authentication sections 12 and 21 eventually share the newly generated random number R to allow the use of the random number R as a cryptographic key. However, after the mutual authentication, another cryptographic key may be generated and sent from the IC card 10 to sensor unit 20.

In the IC card 10, the encryption section 14 encrypts the biological data D in the biological data storage section 11 with the cryptographic key R in the cryptographic key storage section 13, and supplies the obtained ciphertext R[D] to the decryption section 23 in the sensor unit 20 (step ST3).

In the sensor unit 20, upon reception of the ciphertext R[D], the decryption section 23 decrypts the cipertext R[D] with the cryptographic key R in the decryption key storage section 22, and supplies the obtained biological data D to the collation section 25 (step ST4).

The sensor 24 performs a biological measurement on the fingerprint of the user or the like. In biological measurement, e.g., measuring a fingerprint, a finger of the user is put on a measurement surface and a measurement is executed. Upon reception of a biological measurement signal (step ST5), the sensor 24 generates the biological measurement data Dm by electronically converting the biological measurement result, and supplies the biological measurement data Dm to the collation section 25.

The collation section 25 collates the biological measurement data Dm with the biological data D received from the decryption section 23 to authenticate personal identification (step ST6). If the two data D and Dm do not coincide with each other, "NO" is determined, and an error display signal is generated. If the two data D and Dm coincide with each other, "YES" is determined, and permission data is supplied to the arithmetic section 26.

The arithmetic section 26 computes this permission data (step ST7) and supplies the resultant data to the business software 30. Upon reception of the resultant data from the arithmetic section 26, the business software 30 starts to run.

As described above, according to this embodiment, in executing personal authentication, the encryption section 14 of the IC card 10 encrypts the biological data D and supplies the obtained ciphertext R[D] to the sensor unit 20. The decryption section 23 of the sensor unit 20 decrypts the ciphertext R[D] to obtain the biological data D. The collation section 25 then collates the obtained biological data D with the input biological measurement data Dm. With this operation, even if the data between the IC card 10 and sensor unit 20 is tapped, since the data is a ciphertext, no information can be read from the tapped contents. This makes it possible to prevent fraud.

In the IC card 10, the authentication section 12 generates the cryptographic key R (pseudorandom number), and the encryption section 14 supplies, to the sensor unit 20, the ciphertext PS[R] obtained by encrypting the cryptographic key R with the public key Ps of the sensor unit 20, and the ciphertext R[D] obtained by encrypting the biological data D with the cryptographic key R. For this reason, the cryptographic key R of the biological data D can be easily changed. Changing the cryptographic key R frequently can therefore prevent leakage of the biological data D due to tapping or the like and execution of a fraudulent command by a software replacement, thereby increasing the resistance to cryptanalytic attacks.

In addition, since the IC card 10 and sensor unit 20 perform the mutual authentication, the reliability of personal authentication can be improved.

For example, a ciphertext can be sent using a different key for every personal authentication by only sending the biological data D from the IC card 10 to the sensor unit 20 upon general digital sealed letter processing (encrypting the text and signature and certification with a random number and further encrypting the random number with the public key of the other party) without taking the procedure in step ST2. Therefore, an effect similar to that of the present invention can be obtained.

With general digital sealed letter processing, however, there is no guarantee whether the biological data is the one obtained currently. Assume that in the client unit 40, software installed by a fraudulent replacement holds a signal obtained from the IC card 10 a week ago and currently sends the signal to the sensor unit 20 so as to fool the sensor unit 20. In this case as well, the sensor unit 20 determines that the IC card 10 is currently inserted.

In contrast to this, according to this embodiment, since the above mutual authentication including the exchange of random numbers is performed, it can be checked whether the IC card 10 is inserted at the instant and the sensor unit 20 is connected at the instant. This makes it possible to execute the personal authentication more reliably.

In addition, the IC card 10 generates the cryptographic key R, and the key is shared by the sensor unit 20 for every personal authentication. Even if, therefore, internal information leaks from a specific IC card 10 or sensor unit 20, chain reaction leakage of internal information from another IC card 10 or sensor unit 20 can be prevented.

Furthermore, since the key pair (public key Ps—private key Ss) of the sensor unit 20 and the cryptographic key R of the IC card 10 can be independently updated, a convenient system having high resistance to cryptanalytic attacks can be realized.

With the use of biometric techniques, in addition to the above effects, the utility of the system can be further improved because there is no possibility that a password is forgotten and a note on which the password is written is read by another person.

(Second Embodiment)

Figure 4:
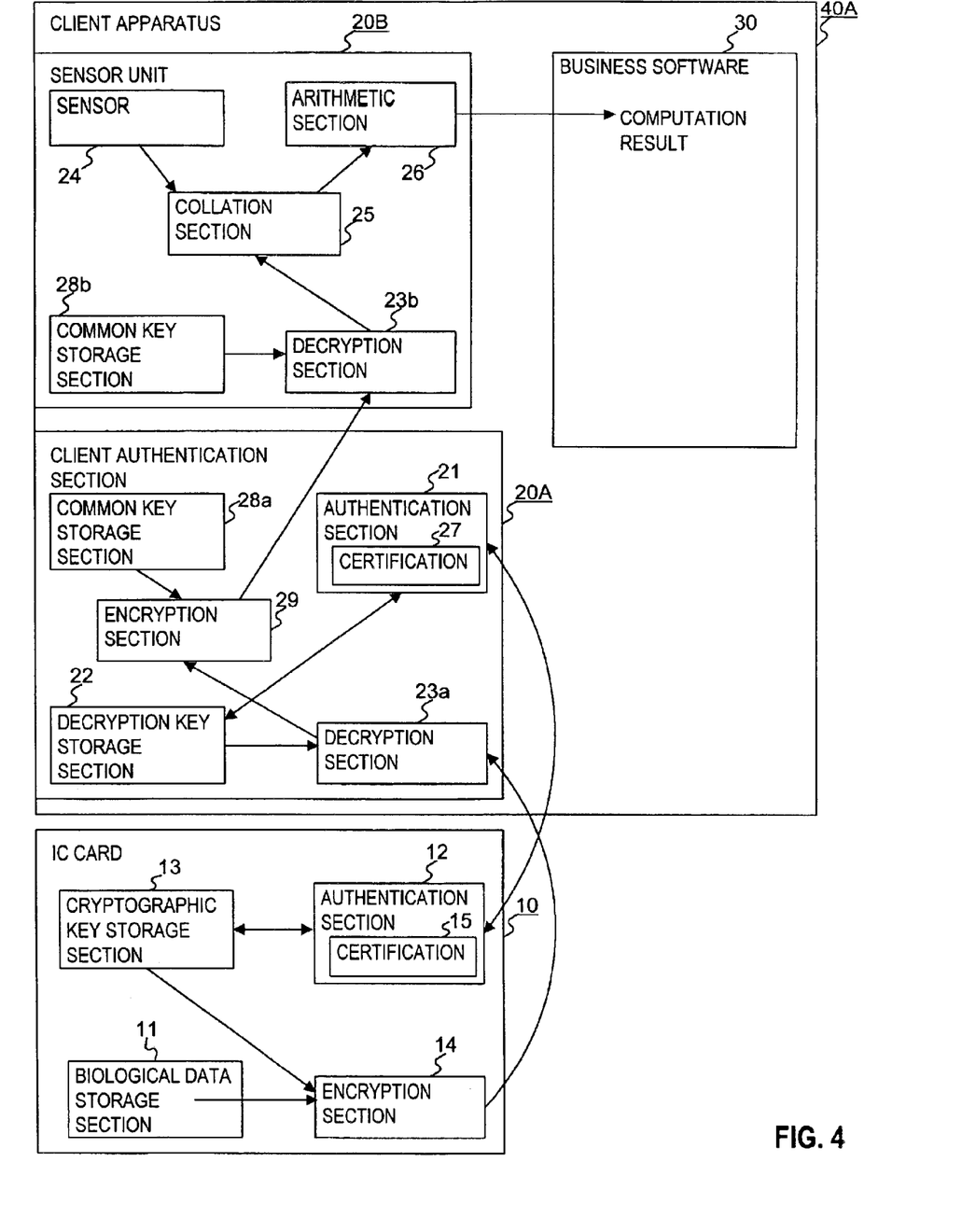
FIG. 4 is a block diagram showing the arrangement of a personal authentication system according to the second embodiment of the present invention.

FIG. 4 is a block diagram showing the arrangement of a personal authentication system according to the second embodiment of the present invention. The same reference numerals as in FIG. 1 denote the same parts in FIG. 4, and a detailed description thereof will be omitted. The differences between these embodiments will be mainly described below.

This embodiment is a modification of the first embodiment. The arrangement of this modification corresponds to a large-scale system, allowing connection of a plurality of sensor units 20B. A client unit 40A in place of the sensor unit 20 includes a tamper-resistant client authentication section 20A and tamper-resistant sensor unit 20B. For the sake of illustrative convenience, FIG. 4 shows only one sensor unit. In practice, however, a plurality of sensor units 20B are present. These sensor units 10B may detect the same biological data or different biological data. In addition, the sensor units 20B are movably and detachably connected to the client unit 40A.

One client authentication section 20A is used, and it has tamper resistance. That is, this section is a fixed section fixed to the client unit. The client authentication section 20A may be fixed to the client unit 40A by welding or mounted thereon with a lock.

This personal authentication system includes three types of tamper-resistant constituent elements, namely an IC card 10, the client authentication section 20A, and the sensor unit 20B.

In this case, the client authentication section 20A has the function of performing a mutual authentication with the IC card 10, decrypting the ciphertext received from the IC card 10, encrypting the decryption result with a secret key, and supplying the resultant ciphertext to the sensor unit 20B.

More specifically, the client authentication section 20A has tamper resistance and includes an authentication section 21, decryption key storage section 22, decryption section 23a, secret key storage section 28a, and encryption section 29. Note that the authentication section 21 and decryption key storage section 22 have the same functions as those described above.

The decryption section 23a has the same decrypting function as that described above and serves to supply obtained biological data D to the encryption section 29.

The secret key storage section 28a is a section in which a secret key Ck supplied from management software (not shown) is stored so as to be read out by the encryption section 29. Note that the management software is software to be handled by only an authorized manager and may be installed in the client unit 40A or another server unit (not shown).

The encryption section 29 has the function of encrypting the biological data D received from the decryption section 23a with the secret key Ck in the secret key storage section 28a and supplying the obtained ciphertext Ck[D] to a decryption section 23b in the sensor unit 20B.

The sensor unit 20B has tamper resistance and includes a secret key storage section 28b, the decryption section 23b, a sensor 24, a collation section 25, and an arithmetic section 26.

The secret key storage section 28b is a section in which the secret key Ck supplied from the management software (not shown) is stored so as to be read out by the decryption section 23b.

The decryption section 23b has the function of decrypting the ciphertext Ck[D] with the secret key Ck in the secret key storage section 28b upon reception of the ciphertext Ck[D] from the encryption section 29 of the client authentication section 20A, and supplying the obtained biological data D to the collation section 25.

The sensor 24, collation section 25, and arithmetic section 26 have the same functions as those described above.

Figure 5:
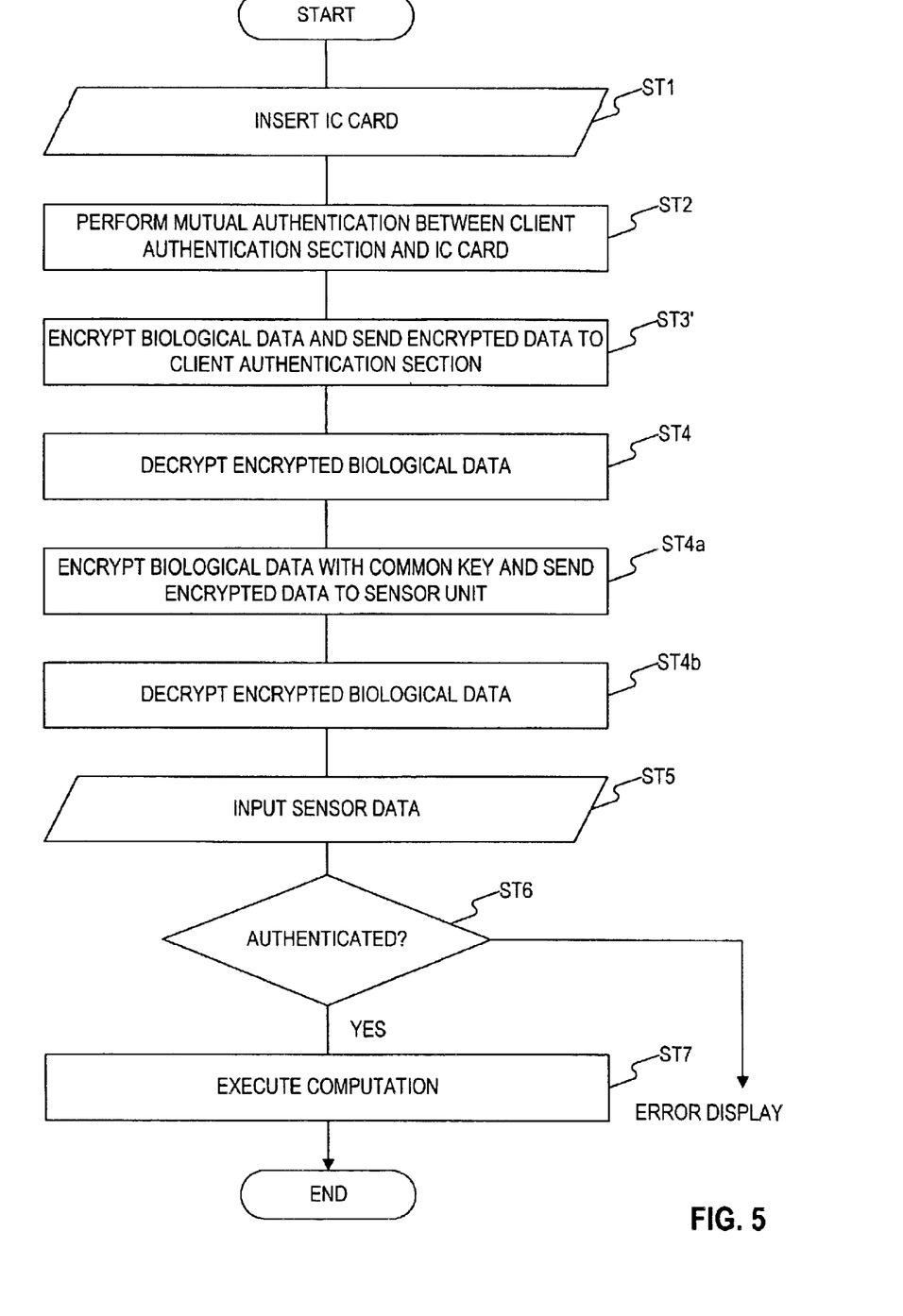
FIG. 5 is a flow chart for explaining the operation of the second embodiment.

The operation of the personal authentication system having the above arrangement will be described next with reference to the flow chart of FIG. 5.

This operation is performed in the same manner as described above up to the decryption processing in steps ST1 through ST4. In other words, steps ST1, ST2, ST3', and ST4 of FIG. 5 may be performed in a manner similar to steps ST1, ST2, ST3, and ST4 of FIG. 2.

More specifically, the decryption section 23a of the client unit 40A has the same decrypting function as that described above, and decrypts ciphertext R[D] with the cryptographic key R in the decryption key storage section 22 upon reception of the ciphertext R[D] from an encryption section 14 of the IC card 10 (step ST4).

Note, however, that the decryption section 23a supplies the obtained biological data D to the encryption section 29.

The encryption section 29 supplies the ciphertext Ck[D], obtained by encrypting the biological data D received from the decryption section 23a with the secret key Ck in the secret key storage section 28a, to the decryption section 23b in the sensor unit 20B (step ST4a).

In the sensor unit 20B, upon reception of the ciphertext Ck[D] from the encryption section 29 of the client authentication section 20A, the decryption section 23b decrypts the ciphertext Ck[D] with the secret key Ck in the secret key storage section 28b (step ST4b), and supplies the obtained biological data D to the collation section 25.

Subsequently, steps ST5 through ST7 are executed in the same manner as described above, and execution of business software 30 is started if the user is authenticated.

As described above, according to this embodiment, even if a personal authentication system includes a plurality of sensor units 20B, the same effects as those of the first embodiment can be obtained by connecting each sensor unit 20B to the client authentication section 20A according to the secret key scheme. In addition, even if connection of each sensor unit 20B is changed or the cryptographic key of the client authentication section 20A is replaced with another one, since the identity of the client unit 40A can be guaranteed, safety can be assured.

Similarly, since the tamper-resistant client authentication section 20A performs authentication processing, even if a plurality of sensor units 20B are connected or each sensor unit 20B is detachable, the safety of authentication processing can be assured.

In addition, since one client authentication section 20A performs authentication processing, only the key pair (public key Ps—private key Ss) of the client authentication section 20A needs to be updated in updating the cryptographic key even in a large-scale arrangement including a plurality of sensor units 20B and a plurality of IC cards 10. In this case, since the updated public key Ps can be sent to the IC card 10 in a mutual authentication, the cryptographic key can be easily updated. That is, this system is high in utility.

(Other Embodiments)

Note that the techniques described in the above embodiments can be applied, as programs that can be executed by computers, to various units by writing the programs in storage media such as magnetic disks (floppy disks, hard disks, and the like), optical disks (CD-ROMs, DVDs, and the like), magnetooptical disks (MOs), and semiconductor memories, or transmitting the programs through communication media.

In each embodiment described above, the collation section 25 outputs resultant information through the arithmetic section 26. However, the present invention is not limited to this. The present invention can be executed in the same manner and the same effects as those described above can be obtained even in a scheme of concealing a computation result to the business software 30 in starting the execution of the business software 30 with an arrangement in which the arithmetic section 26 encrypts the computation result by using the public key Pi of the IC card 10 and sends the resultant data to the IC card 10, and the IC card 10 starts the business software 30 through a server unit (not shown).

Furthermore in each embodiment described above, the two authentication sections 12 and 21 perform mutual authentications using certificates. However, the present invention is not limited to this. Even in a secret key scheme in which both the IC card 10 and the client unit 40 or 40A respectively have secret keys, the present invention can be executed in the same manner and the same effects as those described above can be obtained.

In each embodiment described above, the biological data D is held in the IC card 10, the biological measurement data Dm is input from the sensor 24 in the client unit 40 or 40A, and the two data D and Dm are collated with each other. However, the present invention is not limited to this. The present invention can be executed in the same manner and the same effects as those described above can be obtained even in a scheme in which a password (user information) is held in the IC card 10, a password (user information) is input from an input device (keyboard, touch panel, or the like) in the client unit 40 or 40A, and the two passwords are collated with each other.

In each embodiment described above, the portable unit has been described as the IC card 10 having tamper resistance. However, the present invention is not limited to this.

Even if the portable unit is an arbitrary personal information unit such as a portable telephone or electronic notepad, the present invention can be executed in the same manner and the same effects as those described above can be obtained as long as the unit has tamper resistance and is portable. Furthermore, the communication scheme between the portable unit and the client unit can be modified to an arbitrary communication scheme such as a scheme using radio waves or infrared rays (light having an arbitrary wavelength).

Various changes and modifications can be made within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable unit comprising:

storage means for storing registration data; and encryption means for encrypting the registration data stored in said storage means in executing personal authentication based on the registration data and new input information, and supplying the encrypted registration data to a personal authentication unit which is communicatively connected to said portable unit and executes the personal authentication by using the registration data obtained by decrypting the encrypted registration data.

2. A unit according to claim 1, wherein the registration data is personal biological data.

3. A unit according to claim 1, wherein said unit further comprises random number generating means for generating a random number when the personal authentication is to be executed, and said encryption means comprises means for supplying, to said personal authentication unit, a ciphertext obtained by encrypting the registration data with a random number generated by said random number generating means and a ciphertext obtained by encrypting the random number with a key held by said personal authentication unit.

4. A portable unit comprising:

means for storing registration data; and encryption means for, in executing a personal authentication based on the registration data and new input information, supplying a ciphertext obtained by encrypting the registration data stored in the said storage means to a fixed section which is communicatively connected to said portable unit and performs transfer processing including encryption between said portable unit and a plurality of personal authentication units for performing personal authentication by using the registration data obtained by decrypting the encrypted registration data.

5. A personal authentication system having tamper resistance, comprising:

a tamper-resistant fixed section including:

first tamper-resistant decryption means for obtaining registration data by decrypting a ciphertext supplied from a portable unit for storing the registration data and outputting the ciphertext obtained by encrypting the registration data;

encryption means for sending a ciphertext obtained by encrypting the registration data obtained from said first decryption means with a predetermined cryptographic key;

second decryption means for obtaining registration data by decrypting the ciphertext sent from said decryption means with a predetermined cryptographic key; and collation means for collating the registration data obtained from said second decryption means with the input information.

6. A computer readable medium used for a tamper-resistant portable unit which can communicate with a personal authentication unit for executing personal authentication and includes a computer, said medium storing a program which when executed performs a method comprising:

causing said computer to execute a procedure for storing registration data in storage means; and causing said computer to execute an encryption procedure for encrypting the registration data and supplying the obtained ciphertext to said personal authentication unit when executing the personal authentication by using the registration data obtained by decrypting the encrypted registration data.

7. A computer readable medium used for a tamper-resistant portable unit having a computer and capable of communicating with a personal authentication system including a tamper-resistant fixed section which has a computer and obtains registration data by decrypting a ciphertext supplied from a tamper-resistant portable unit for storing registration data and outputting a ciphertext obtained by encrypting the registration data, encrypts the obtained registration data by using a predetermined cryptographic key, and transfers the ciphertext to a plurality of personal authentication units for executing personal authentication, and said plurality of tamper-resistant personal authentication units each of which has a computer, decrypts the ciphertext from said fixed section, and collates obtained information with input information, thereby executing a personal authentication, said medium storing a program which when executed performs a method comprising:

causing said computer to execute a procedure for storing registration data; and causing said computer to execute an encryption procedure for supplying the ciphertext obtained by encrypting the registration data to said fixed section when executing the personal authentication by using the registration data obtained by decrypting encrypted registration data.

8. A computer readable medium used for a personal authentication system including a tamper-resistant fixed section which has a computer and obtains registration data by decrypting the ciphertext supplied from a tamper-resistant portable unit for storing registration data and outputting a ciphertext obtained by encrypting the registration data, encrypts the obtained registration data by using a predetermined cryptographic key, and transfers the ciphertext to a plurality of personal authentication units for executing personal authentications, and said plurality of tamper-resistant personal authentication units each of which has a computer, decrypts the ciphertext from said fixed section, and collates obtained information with input information, thereby executing a personal authentication, said medium storing a program which when executed performs a method comprising:

causing said computer of said fixed section to execute a first decryption procedure for obtaining registration data by decrypting a ciphertext supplied from said portable unit;

causing said computer of said fixed section to execute a second encrypt procedure for encrypting the registration data obtained by the first decryption procedure with a predetermined cryptographic key and sending the obtained ciphertext;

causing said computer of each of said personal authentication units to execute a second decryption procedure for obtaining registration data by decrypting the ciphertext sent by the second encryption procedure with a predetermined cryptographic key; and causing said computer of each of said personal authentication units to execute a collation procedure for collating the registration data obtained by the second decrypt procedure with the input information.

9. A personal authentication system comprising:

a tamper-resistant portable unit including:

a memory for storing registration data;

encryption means for, when a personal authentication is to be executed, encrypting the registration data stored in said memory;

supply means for supplying the registration data encrypted by said encryption means to a personal authentication unit;

a tamper-resistant personal authentication unit capable of communicating with said portable unit, including:

input means for inputting registration data;

decryption means for decrypting the encrypted registration data supplied from said supply means; and collation means for collating the registration data decrypted by said decryption means with the registration data input by said input means.

10. A system according to claim 9, wherein said portable unit and said personal authentication unit further comprise authentication means for performing mutual authentication between said portable unit and said personal authentication unit.

11. A system according to claim 10, wherein said authentication means respectively have certificates and private keys and execute verification of the certificates and mutual authentication of authenticating information indicating that said unit and said unit mutually have the private keys.

12. A system according to claim 11, wherein said portable unit verifies the certificate of said personal authentication unit by decrypting a signature of an authentication office which is contained in the certificate received from said personal authentication unit by using a public key of the authentication office, and performing true-false determination of the decryption result by using a name of the authentication office.

13. A system according to claim 9, wherein the input information collated by said collation means is personal biological information.

14. A portable unit used for said personal authentication system defined in claim 9, comprising:

random number generating means for generating a random number when the personal authentication is to be executed; and encryption means for generating a first ciphertext by encrypting the registration data with the random number generated by said random number generating means, generating a second ciphertext by encrypting the random number by using a key obtained from said personal authentication unit, and supplying the first and second ciphertexts to said personal authentication unit.

15. An article of manufacture comprising:

a computer readable medium having computer readable program code means embodied therein for causing a personal authentication to be performed between a portable unit and a personal authentication unit, the computer program code means in said article of manufacturing comprising:

computer readable program code means for causing a computer to encrypt, when the personal authentication is to be performed, the registration data and to supply the encrypted registration data to the personal authentication unit;

computer readable program code means for causing the computer to decrypt the encrypted data to obtain the registration data;

computer readable program code means for causing the computer to input registration data; and computer readable program code means for causing the computer to collate the registration data obtained by the decryption with the inputted registration data.

16. A personal authentication system comprising:

a tamper-resistant portable unit including:

a memory for storing registration data;

a tamper-resistant fixed section containing a plurality of personal authentication units for performing encryption and transfer processing between said portable unit and said plurality of personal authentication units;

first encryption means for supplying a ciphertext obtained by encrypting the registration data stored in said memory to said fixed section;

the said fixed section including:

first decryption means for obtaining registration data by decrypting the ciphertext supplied from said first encryption means; and second encryption means for encrypting the registration data obtained by said first decrypting means with a predetermined cryptographic key, and sending the obtained ciphertext;

said plurality of personal authentication units having tamper-resistance is capable of executing personal authentications on the basis of the registration data in said portable unit and new input information, each of said personal authentication units including:

second decryption means for obtaining registration data by decrypting the ciphertext sent from said second encryption means with a predetermined cryptographic key; and collation means for collating the registration data obtained by said second decryption means with the input information.

17. A portable unit used for said personal authentication system defined in claim 16, comprising:

random number generating means for generating a random number when the personal authentication is to be executed; and first encryption means for supplying, to said fixed section, a ciphertext obtained by encrypting the registration data with the random number generated by said random number generating means and a ciphertext obtained by encrypting the random number with a key of said fixed section.

* * * * *